United States Patent
Pachner et al.

(10) Patent No.: US 11,860,589 B2
(45) Date of Patent: Jan. 2, 2024

(54) METHOD AND APPARATUS FOR TUNING A REGULATORY CONTROLLER

(71) Applicant: Honeywell International Inc., Charlotte, NC (US)

(72) Inventors: Daniel Pachner, Prague (CZ); Vladimir Havlena, Prague (CZ); Pavel Otta, Velky Osek (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/141,806

(22) Filed: Jan. 5, 2021

(65) Prior Publication Data

US 2022/0214650 A1   Jul. 7, 2022

(51) Int. Cl.
G05B 11/42   (2006.01)
G05B 13/02   (2006.01)
G05B 13/04   (2006.01)

(52) U.S. Cl.
CPC .......... *G05B 11/42* (2013.01); *G05B 13/024* (2013.01); *G05B 13/042* (2013.01); *G05B 13/048* (2013.01)

(58) Field of Classification Search
CPC .... G05B 11/42; G05B 13/024; G05B 13/042; G05B 13/048; G05B 13/021;
(Continued)

(56) References Cited

U.S. PATENT DOCUMENTS 4,669,040 A * 5/1987 Pettit ............ G05B 15/02
                                         318/610
6,198,246 B1 * 3/2001 Yutkowitz ......... G05B 11/42
                                              318/610
(Continued)

FOREIGN PATENT DOCUMENTS

CA   2122472 C * 12/2000 ........... G05B 13/024
CN   107783423 A    3/2018
(Continued)

OTHER PUBLICATIONS

Auof et al; "A PSO algorithm applied to a PID controller for motion mobile robot in a complex dynamic environment," In Proceedings of the International Conference on Engineering & MIS (ICEMIS), Monastir, Tunisia, May 8-10, 2017.
(Continued)

*Primary Examiner* — Thomas C Lee
*Assistant Examiner* — Anzuman Sharmin
(74) *Attorney, Agent, or Firm* — Seager, Tufte & Wickhem, LLP

(57) ABSTRACT

During each of a plurality of iterations, a policy of a controller is updated and at least part of a process is controlled using the updated policy. The updated policy is associated with a performance level of the controller. For each iteration, the updated policy is determined using the associations generated during one or more previous iterations between the policies and the corresponding performance levels of the controller in controlling the at least part of the process, such that the updated policy is optimized to have a highest likelihood of producing a positive change in the performance level of the controller in controlling the at least part of the process rather than optimized to have a highest likelihood of producing a largest positive magnitude of change in the performance level of the controller in controlling the at least part of the process relative to the previous iteration.

18 Claims, 13 Drawing Sheets

(58) Field of Classification Search
CPC ..... G05B 13/0265; G05B 11/36; G06F 1/206;
G06F 1/3203; G06F 1/3206; G06F 1/324;
G06F 11/3058; G06F 11/3409; G06F
11/3447; G06F 9/5094; Y02D 10/00
See application file for complete search history.

(56) References Cited

U.S. PATENT DOCUMENTS

| | | | | |
|---|---|---|---|---|
| 6,264,111 | B1* | 7/2001 | Nicolson | G05B 13/042 236/51 |
| 6,546,295 | B1* | 4/2003 | Pyotsia | G05B 13/024 706/900 |
| 7,346,402 | B1* | 3/2008 | Stahl | G05B 17/02 700/28 |
| 8,001,063 | B2 | 8/2011 | Tesauro et al. | |
| 8,694,131 | B2* | 4/2014 | Burns | G01C 21/3602 700/121 |
| 10,416,660 | B2* | 9/2019 | Maturana | G05B 23/0227 |
| 2003/0149675 | A1* | 8/2003 | Ansari | H04N 21/443 706/2 |
| 2005/0137721 | A1* | 6/2005 | Attarwala | G05B 13/048 700/86 |
| 2012/0215326 | A1* | 8/2012 | Brown | G05B 19/0426 700/42 |
| 2015/0355692 | A1* | 12/2015 | Paul | G06F 1/3203 713/322 |
| 2017/0314800 | A1* | 11/2017 | Bengea | F24F 11/62 |
| 2018/0012137 | A1 | 1/2018 | Wright et al. | |
| 2019/0187631 | A1* | 6/2019 | Badgwell | G06N 3/006 |

FOREIGN PATENT DOCUMENTS

| | | | |
|---|---|---|---|
| CN | 109600448 A | 4/2019 | |
| EP | 1422584 A1 * | 5/2004 | ............... B62D 1/28 |
| JP | 2019022205 A | 2/2019 | |

OTHER PUBLICATIONS

Bagnell et al; "Autonomous helicopter control using reinforcement learning policy search methods," In International Conference Robotics and Automation. IEEE, 2001.

Busoniu et al; "Reinforcement Learning for Control: Performance, Stability, and Deep Approximators," Annual Reviews in Control, 24 pages, 2018. Abstract. This manuscript version is made available under the CC-BY-NC-AD 4.0 license http://creativecommons.org/licenses/by-nc-nd/4.0/.

Forsell et al; "Closed-loop Identification, Methods, Theory, and Applications," U Linkoping Studies in Science and Technology. Dissertations, Department of Electrical Linkoping University, SE-581 83 Linkoping, Sweden Linkoping, 1999.

Jana et al; Tuning of PID Controller for Reverse Osmosis (RO) Desalination System Using Particle Swarm Optimization (PSO) Technique. Int. J. Control Theory Appl. vol. 10, pp. 83-92, 2017.

Karkus et al; "QMDP-Net: Deep learning for planning under partial observability," in Advances in Neural Information Processing Systems, pp. 4697-4707, 2017.

Kumar, "A Survey of Some Results in Stochastic Adaptive Control," SIAM Journal on Control and Optimization vol. 23, No. 3, pp. 219-380, 1985.

Quianshi et al; "Adaptive PID Controller Based on Q-learning Algorithm," IET Research Journals, The Institution of Engineering and Technology, pp. 1-11, 2015.

Mahmoudi, B., et al., "Towards autonomous neuroprosthetic control using Hebbian reinforcement learning," Journal of Neural Engineering, 10 (2013) 066005 (15 pp).

Extended European Search Report, EP Application No. 21217649.9, dated Jun. 9, 2022 (11 pgs).

* cited by examiner

US 11,860,589 B2

METHOD AND APPARATUS FOR TUNING A REGULATORY CONTROLLER

TECHNICAL FIELD

The present disclosure relates generally to tuning controllers, and more particularly to methods and apparatuses for automatically tuning regulatory controllers.

BACKGROUND

Regulatory controllers are used in a variety of different types of control systems to regulate operation of a number of different control system components in a wide variety of applications. Many regulatory controllers are poorly tuned for a given application, meaning that the control systems they regulate are often not operating efficiently. This can result in wasted energy, excessive wear of control system components, as well as numerous other problems. Manually tuning such regulatory controllers in the field can be tedious, error prone and time consuming, especially in systems controlled by numerous such regulatory controllers. What would be desirable is an automated way to tune such regulatory controllers in the field.

SUMMARY

The present disclosure relates generally to tuning controllers, and more particularly to methods and apparatuses for automatically tuning regulatory controllers in the field. An example is a method of tuning a controller that is configured to control at least part of a process. During each of a plurality of iterations, a policy of the controller is updated and the at least part of a process is controlled using the updated policy. The updated policy is associated with a performance level of the controller in controlling the at least part of the process. For each iteration, the updated policy is determined using the associations generated during one or more previous iterations between the policies and the corresponding performance levels of the controller in controlling the at least part of the process, such that the updated policy is optimized to have a highest likelihood of producing a positive change in the performance level of the controller in controlling the at least part of the process rather than optimized to have a highest likelihood of producing a largest positive magnitude of change in the performance level of the controller in controlling the at least part of the process relative to the previous iteration.

Another example is a method of tuning a regulatory controller that is configured to regulate at least part of a process. During each of a plurality of iterations, one or more tuning parameters of the regulatory controller are updated, and the at least part of the process is regulated using the one or more updated tuning parameters. A performance of how well the regulatory controller controlled the at least part of the process is monitored. For each iteration, the one or more updated tuning parameters are determined based at least in part on the performance of how well the regulatory controller performed in controlling the at least part of the process during one or more previous iterations, such that the updated one or more tuning parameters are optimized to have a highest likelihood of producing a positive change in the performance of how well the regulatory controller controlled the at least part of the process rather than optimized to have a highest likelihood of producing a largest positive magnitude of change in the performance of how well the regulatory controller controlled the at least part of the process relative to the immediate previous iteration.

Another example is a controller for controlling at least part of a process. The controller includes a memory for storing a policy and a processor that is operatively coupled to the memory. The processor is configured to perform a plurality of iterations. During each iteration, the controller updates the policy of the controller and controls the at least part of the process using the updated policy. The controller associates the updated policy with a performance level of the controller in controlling the at least part of the process. During each iteration, the updated policy is determined using the associations generated during one or more previous iterations between the policies and the corresponding performance levels of the controller in controlling the at least part of the process, such that the updated policy is optimized to have a highest likelihood of producing a positive change in the performance level of the controller in controlling the at least part of the process rather than optimized to have a highest likelihood of producing a largest positive magnitude of change in the performance level of the controller in controlling the at least part of the process relative to the immediate previous iteration.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
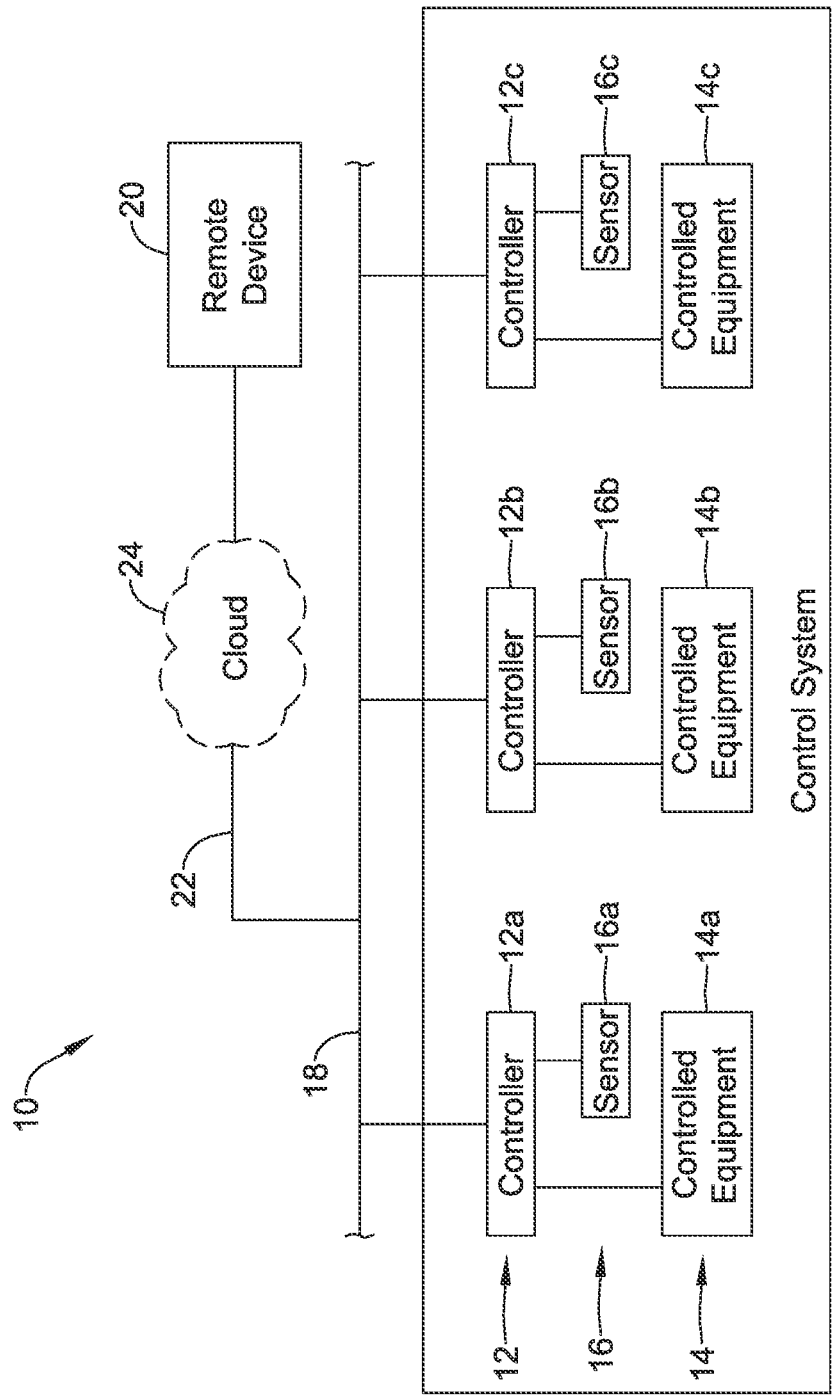
FIG. 1 is a schematic block diagram of an illustrative control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative control system 10. The control system 10 may represent any number of different control systems in which one or more controllers are used to regulate operation of one or more pieces of equipment. The control system 10 may generally represent a process control system that regulates a variety of different operations within any of a variety of different industrial or other processes. A refinery is an example of an industrial process. The control system 10 may generally represent a building control system that regulates a variety of different systems within a building. For example, the control system 10 may generally represent portions of a Heating, Ventilating and Air Conditioning (HVAC) system. The control system 10 may generally represent portions of a lighting system within a building or a security system within a building. These are just examples.

The illustrative control system 10 includes a number of controllers 12 that are individually labeled as 12a, 12b and 12c. While a total of three controllers 12 are shown, it will be appreciated that this is merely illustrative, as the control system 10 may have any number of controllers 12 and may have a substantially greater number of controllers 12. In some instances, the controllers 12 may be part of a hierarchal control system that includes layers of control, with controllers at each control layer. The controllers 12 may be considered as being at a lowest or regulatory level in which each of the controllers 12 regulate operation of a corresponding piece of controlled equipment 14. The controlled equipment 14 is individually labeled as 14a, 14b and 14c. As shown, each controller 12 is operably coupled with a corresponding single piece of controlled equipment 14. In some cases, a single controller 12 may control two or more distinct pieces of controlled equipment 14. While a total of three pieces of controlled equipment 14 are shown in FIG. 1, it will be appreciated that this is merely illustrative, as the control system 10 may have any number of pieces of controlled equipment 14 and may have a substantially greater number of pieces of controlled equipment 14.

The controlled equipment 14 may represent any of a variety of different controllable components. In an HVAC system, for example, each piece of the controlled equipment 14 may represent an actuatable HVAC component such as a hot water valve, an air damper, a Variable Air Volume (VAV) box or other Air Handling Units (AHUs). The control system 10 may be considered as including sensors 16, which are individually labeled as 16a, 16b and 16c. While a total of three sensors 16 are shown, it will be appreciated that this is merely illustrative, as the control system 10 may have any number of sensors 16. Each sensor 16 may be operably coupled with one or more of the controllers 12, and may provide feedback to the controller(s) 12 that permits the controller(s) 12 to more accurately regulate the corresponding piece(s) of controlled equipment 14.

If the piece of controlled equipment 14a is, for example, a hot water valve providing hot water on demand to a radiator, the sensor 16a may be a temperature sensor that reports a current room temperature to the controller 12a that is operably coupled with the piece of controlled equipment 14a. If the current room temperature is below a temperature setpoint for that room, the controller 14a may command the piece of controlled equipment 14a (in this case, a hot water valve) to open, or to open further if already open. When the current room temperature reaches or approaches the temperature setpoint for that room, the controller 14a may command the piece of controlled equipment 14a (in this case, a hot water valve) to at least partially close. This is just an example. In some cases, it may be appropriate to think about each piece of controlled equipment 14 as representing a single actuatable device that can be opened or closed, or turned up or turned down, in response to a command to do so from the corresponding controller 12, with the corresponding sensor 16 providing feedback to the controller 12 that enables the corresponding controller 12 to better regulate operation of the piece of controlled equipment 14. As can be seen, the delay between when the hot water valve is opened and when the room temperature changes may be dependent on the size of the room, the heat transfer efficiency of the radiator, the distance the sensor is from the radiator, as well as many other factors that are specific to the particular installation. Other factors such as how much the water valve should be opened and/or closed under different circumstances will often depend on the particular installation. These are just examples. As can be seen, in general, a controller that is generically tuned in the factory will often not be optimally tuned for a particular installation in the field.

In some instances, each of the controllers 12 may be operably coupled with a network 18. The network 18 may represent an internal network within a building or other facility. The network 18 may represent an internal network within a building, a factory or a refinery, for example. While the pieces of controlled equipment 14 are shown as being coupled directly to the corresponding controller 12, and are not shown as being coupled directly to the network 18, in some cases both the controllers 12 and the pieces of controllable equipment 14 may be directly coupled to the network 18. In this case, each controller 12 may communicate with its corresponding piece of controllable equipment 14 through the network 18. In some cases, the sensors 16 may also be directly coupled to the network 18, rather than to a corresponding controller 12.

In some instances, the control system 10 may communicate with a remote device 20 via a network 22. The network 22 may be considered as being an external network, and may for example rely on the Internet as being at least part of the network 22. In some cases, the network 22 may have a cloud-based component, represented by the cloud 24. The remote device 20 may be a computer that is remote from the facility in which the control system 10 is located. The remote device 20 may be a server such as a cloud-based server. In some instances, as will be discussed, the remote device 20 may be configured to receive data from the controllers 12 and be able to help fine tune operation of the controllers 12.

Figure 2:
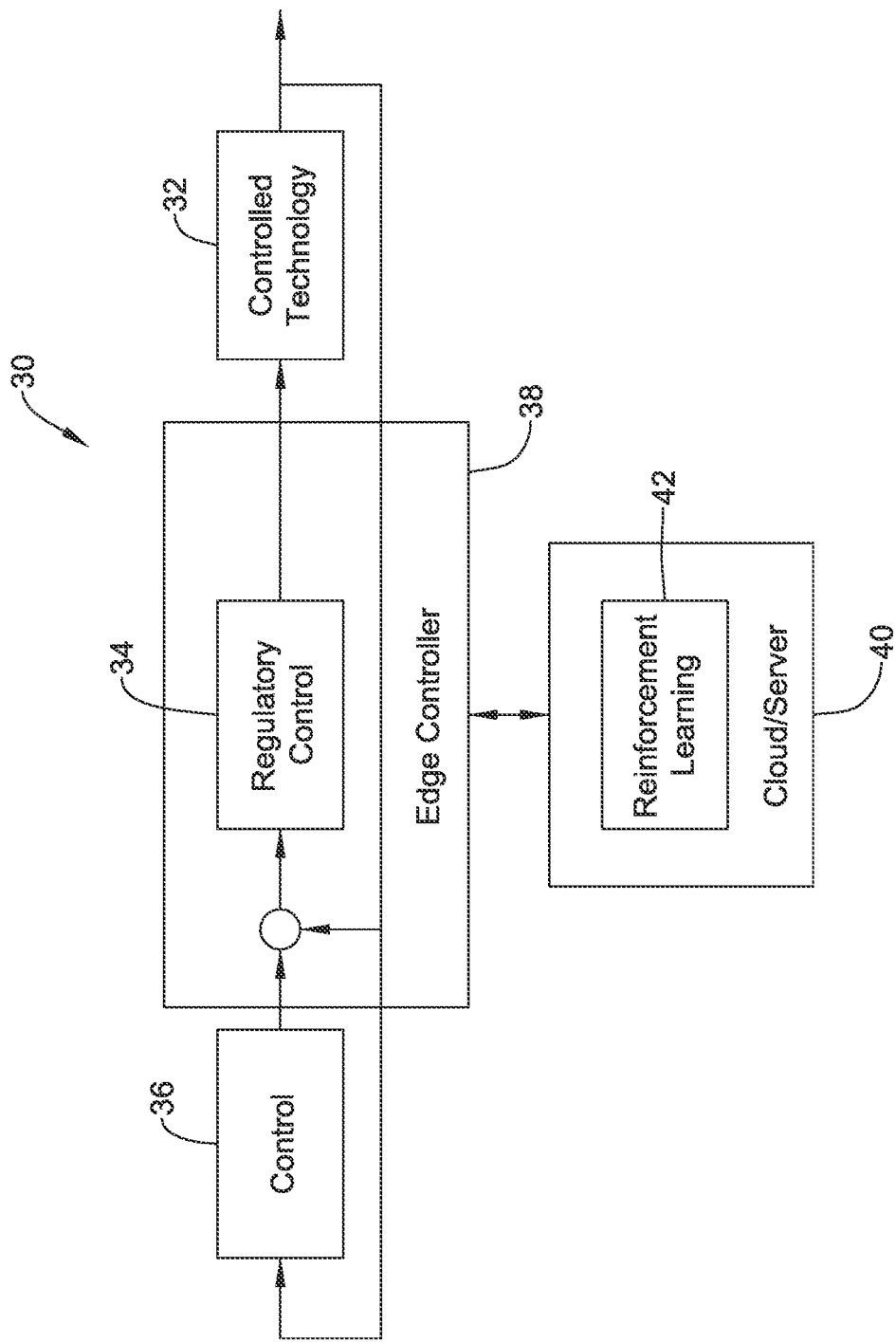
FIG. 2 is a schematic block diagram of an illustrative control system.

FIG. 2 is a schematic block diagram of an illustrative control system 30 that provides an example of a hierarchal nature of some control systems. The illustrative control system 30, which may be considered as being an example of the control system 10, and vice versa, includes a controlled technology level 32. The pieces of controlled equipment 14 shown in the control system 10 may be considered as being at the controlled technology level 32. The next level up from the controlled technology level 32 is a regulatory control level 34. The controllers 12 shown in the control system 10 may be considered as being within the regulatory control level 34. Above the regulatory control level 34 is a control level 36. The control level 36 may be considered as including one or more controllers that each control a number of controllers that are at the regulatory control level 34. In one example, a controller at the regulatory control level 34 may control an individual hot water valve, while a controller at the control level 36 may oversee operation of each of the controllers that themselves control hot water valves throughout a facility.

In some cases, the controllers at the regulatory control level 34 may be considered as being edge controllers, as seen by an edge controller 38. The edge controller 38 controls operation of the equipment at the controlled technology level 32 for which the edge controller 38 is responsible. The edge controller 38 may communicate with a cloud-based server 40. In some cases, and as will be discussed, the cloud-based server 40 may include a reinforcement learning block 42 that may help to fine tune the edge controller 38. In some cases, the edge controller and/or controller 36 may include a reinforcement learning block 42 to help fine tune the edge controller 38 instead of or in addition to the cloud-based server 40.

Figure 3:
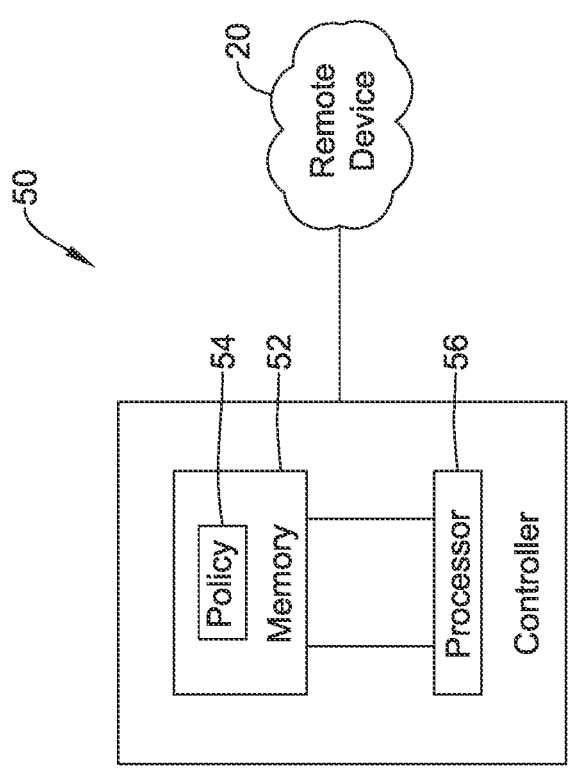
FIG. 3 is a schematic block diagram of an illustrative controller usable in the illustrative control systems of FIGS. 1 and 2.

FIG. 3 is a schematic block diagram showing an illustrative controller 50 for controlling at least part of a process. The controller 50 may be considered as an example of the controllers 12 shown in the control system 10. The controller 50 may be considered as an example of the edge controller 38 shown in the control system 30. The controller 50 includes a memory 52 for storing a policy 54 of the controller 50. As will be described, the policy 54 may be used in improving operation of the controller 50 by fine tuning the control parameters by which the controller 50 operates. As an example, if the controller 50 is a Proportional Integral Derivative (PID) controller, the parameters that can be adjusted may include a Proportional (P) gain parameter, an Integral (I) gain parameter and a Derivative (D) gain parameter. A processor 56 is operatively coupled to the memory 52 such that the processor 56 is able to access and update the policy 54.

The processor 56 is configured to perform a plurality of iterations. During each iteration, the processor 56 updates the policy 54 of the controller 50 and controls at least part of the process using the updated policy 54 for a period of time. In some cases, the processor 56 may be configured to determine the updated policy 54 to use during each iteration. The processor 56 is configured to associate the updated policy 54 with a performance level of the controller 50 in controlling the at least part of the process. During each iteration, the updated policy 54 is determined using the associations generated during one or more previous iterations between the previous policies 54 and the corresponding performance levels of the controller 50 in controlling the at least part of the process, such that the updated policy is optimized to have a highest likelihood of producing a positive change in the performance level of the controller 50 in controlling the at least part of the process rather than optimized to have a highest likelihood of producing a largest positive magnitude of change in the performance level of the controller 50 in controlling the at least part of the process relative to the immediate previous iteration(s). In some instances, the processor 56 may be configured to communicate one or more parameters indicative of the performance level of the controller 50 in controlling the at least part of the process to the remote device 20 and to subsequently receive the updated policy 54 from the remote device.

In some cases, automated tuning may improve the performance of the controller 50. Reinforcement Learning (RL) may be used to help automatically tune the controller. One challenge with RL is that regulatory level controllers such as the controllers 12, the edge controller 38 and the controller 50, is that the regulatory level controllers may lack the processing power necessary to perform RL.

Generally, RL is a form of artificial intelligence that is concerned with optimizing the behavior of an RL agent, or to maximize the return for the RL agent. RL can describe many real-world decision-making problems including optimizations of company business profits, online auctions, election campaigns, computer or board games strategies, air combat problems, robotics etc., and has been successfully applied in many of these areas. In RL problem formulation, the RL agent is interacting with an uncertain environment that changes its state with time as a result of actions of the RL agent as well as intrinsic system dynamics.

The RL agent usually operates in the discrete time domain periodically. For every discrete time instant, the agent may choose an action a based on the state of environment x and its policy $\pi$. The agent receives a reward $r(a, x)$ which depends on the action chosen and the current state of environment. Subsequently, the environment state y will be partly affected by the actions taken previously. The optimal behavior of the agent should account not only for the immediate rewards but it should also consider the future impacts of the actions on the state of the environment. The optimal agent's behavior should involve the capability of planning. Accordingly, RL theory is often concerned with finding the optimal agent's policy when no model of the environment is available. It is an algorithm, which would use the previous observations, environment states, actions and rewards as the input data. It does not rely on other information, i.e. it is purely empirical. This fact, that the optimization does not rely on various assumptions, makes the RL a promising method for solving the regulatory control problem. RL calculates an approximation of the optimal policy. The policy is a function that maps the environment states to agent's actions. It can often be represented by a table, in which the agent may look up the optimal action to choose based on the current state.

In a contemplated regulatory control regime, the agent chooses an action, e.g. the valve position for the next few seconds. This time can be called an evaluation period. The reward received for this action may be a combination of the temperature control accuracy and the valve position change over the evaluation period. Ideal control achieves good control accuracy with minimum actuator moves. In some instances, on the regulatory control level, the energetic efficiency of the building will not be directly considered as this problem will be solved on higher levels of the control hierarchy.

The RL can be implemented using value functions, e.g. an advantage function. Another popular value function is state-action value function called Q-function. The results should be identical regardless whether the advantage or Q-function is used. The advantage function is more convenient for the present discussion.

The advantage function is defined using the state-value or cost-to-go function $V^\pi(x)$. In this example, the state-value $V^\pi(x)$ is defined as the expected (i.e. statistically expected) agent's return when starting with the environment at state x and pursuing a given policy $a=\pi(x)$. The agent's policy is a function, possibly randomized, mapping the states of environment to the agent's actions a. Then, the advantage $A^\pi(a, x)$ of an action a at a state x with respect to the baseline policy $\pi$ is the difference between two costs-to-go: (1) the return expected when using the specified action a at the initial state x before switching to the baseline policy $\pi$ minus (2) the return expected when following the baseline policy from x. Formally:

$$A^\pi(\alpha,x)=r(\alpha,x)+E\{V^\pi(y)|\alpha,x\}-V^\pi(x)$$

The advantage is the expected return difference caused by one-step variation in a given policy. The instantaneous reward received at state x is denoted as r(a, x). Per the above definitions, $V^\pi(x)$ is the return when following the baseline policy $\pi$ from x, whereas $r(a, x)+V^\pi(y)$ would be the return when applying action a at state x and causing the next environment state to be y. Because the next state y is a random variable due to a non-deterministic environment, it is necessary to take the conditional expectation $E\{V^\pi(y)|a, x\}$ instead of simply $V^\pi(y)$.

The advantage function has the following properties which make this function useful in finding the optimal policies:

If $A^\pi(\alpha, x) \leq 0$ for all $\alpha$ and x, then $\pi$ is the optimal policy.
If $A^\pi(\alpha, x) > 0$, then applying $\alpha$ at x defines an improved policy with a better return.

The optimal policy can be found improving any initial policy iteratively gradually replacing all actions with ones which have positive (+ sign) advantage with respect to the current policy. The process terminates when the set of such actions is empty. Then the policy is optimal (i.e. no policy can gain better return on average). This policy improvement step is the core of policy iterations method.

In what is known as a greedy RL approach, the RL agent attempts to maximize the magnitude of positive change relative to the previous iteration. In the greedy approach:
1. The advantage function for a policy $\pi$ is estimated.
2. A new policy is defined by replacing the previous actions with $$\pi_{new}(x) = \arg\max_a A^\pi(a, x),$$

i.e. the action with maximum magnitude advantage, i.e. making the maximum positive improvement.
3. The steps 1. And 2. are repeated with the updated policy if the policy changed in 2.

Rather than using the greedy approach, it has been found that a better approach is to use a non-greedy approach that attempts to optimize for a highest likelihood of producing a positive change in advantage, rather than a highest likelihood of producing a largest positive magnitude of change in advantage. Such non-greedy methods change the convergence process but the ultimate optimized policy remains basically the same.

The advantage function may be estimated from the data using approximation techniques to fit the observed data $\{[x_i, y_i, \alpha_i, r_i], i=1, 2 \ldots \}$. These techniques can involve least squares optimization. The data are obtained by trying various actions at various states. This advantage estimation (or Q-function estimation) is the key element of many RL algorithms. The optimal policy is found when advantage function becomes known. In reality, it can only be approximated based on a finite data set that is available. Hence, the reinforcement learning is a process of converging to the optimal policy but generally not achieving it in a finite time.

When the environment state is not completely known to the RL agent, the whole relationship between actions, states and rewards may get obscured and the learning process may not converge or its rate of convergence may be compromised. This makes RL application for regulatory control often difficult and possibly unreliable.

In the regulatory control case, not all environment states are available. As a general rule, so-called transient states will be unknown. This can be illustrated using an example: the controller opens a hot water valve more. This action does not start increasing the controlled temperature immediately. At first, the heat increases the temperature of the heat exchanger, then the heat exchanger increases the temperature of the air around the heat exchanger, which is mixed with the air in the room, which will finally increase the temperature of the sensor body. Only then the algorithm will detect the change. There will be a delay. Only after a time (maybe several minutes), the change of the controlled temperature trend can be clearly noticed by the algorithm. The controlled temperature is the state that is at the end of the causal chain.

Suppose what happens if the RL agent opens the valve but instead of waiting a sufficient time to notice the temperature trend change, it tries a new action too soon: it closes the valve this time. At this moment, the heat released by the previous opening action will arrive to the sensor. The agent will now conclude that the hot water valve closing (current action) makes the air temperature increase (which is in fact an effect of the previous action). Unfortunately, the conclusion is grossly incorrect and will have catastrophic impact on the controller performance. The trouble is that the environment state is also containing intermediate states $x_i$ not included in x known to the RL agent.

Accordingly, short evaluation periods may not be optimal. Rather, it may be better to sacrifice the speed of learning in favor of robustness using a sufficiently long evaluation period, e.g. several minutes instead of one second (one second may be a typical sampling period used in BMS regulatory control layer). The extended period will effectively eliminate most problems stemming from unknown intermediate states. Any states which settle down in less than a minute will then not cause a problem. The knowledge of controlled states will then be sufficient.

The disadvantage of extended evaluation periods is that the process will be uncontrolled for more than one minute, i.e. the agent will set the valve position and will not be allowed to change it for next few minutes. It will be regarded as unacceptable for many regulatory control loops. The control will be irresponsive.

The extended evaluation period idea can still be used if the agent's action is not interpreted as choosing a valve position but choosing a control law. Testing an action then means running the controller with fixed parameters over the evaluation period. Then the process may be controlled always using a short sampling period, just the controller parameters will be updated only occasionally.

Running a fixed controller for a sufficiently long period effectively eliminates problems with unknown intermediate states provided the controller is stabilizing the process and thus attenuating the effect of the intermediate states. The situation changes when the controller causes loop instability. Then the effects do not vanish over the testing period even if the period would be arbitrarily long. For the above reason, an extended evaluation period cannot be viewed as the ultimate solution to the problem.

Many potential RL applications problems caused by the unknown intermediate states could be eliminated by two choices:
1. Choosing a sufficiently long evaluation period to eliminate the effects of those states.
2. Defining the agent's action as the control law (e.g. PID gains) selection, not actuator position, to avoid irresponsiveness during the evaluation period.

As noted, the above two choices create a new problem: the advantage function estimate will be grossly affected by feedback loop instability which will be amplifying the intermediate effects instead of attenuating it. The longer the evaluation period, the more the y state will depend on $x_i$. Moreover, the instable control is likely to hit some nonlinearity or saturation throughout the evaluation period: e.g. the valve will be either fully open or fully closed. These effects make the data obtained from such evaluation period contradictory, non-repeatable and often difficult to model. The situation is that:
1. Those RL agent's actions which are close to optimal will produce valid data.
2. Incorrect actions will produce low quality data which will cause problems in the algorithm.

This situation resembles the role of outliers known in various problems in mathematical statistics, e.g. regression analysis. It is known that least squares estimators provide a consistent parameter estimates for many statistical models. On the hand, it is known that the least squares estimators are very inefficient when the probability distribution of errors is not normal, especially when large errors are more likely to occur. A handful of outliers may make the least squares estimates inaccurate. A solution to the outlier problem is to minimize other function than the sum of squares. The sum of Tukey's biweight (also known as bisquare) functions is a known method. Biweight behaves like the squared error function at first, but for larger errors, the function becomes constant. In this way, the sensitivity to outliers is limited. Biweight is just one example of a wider class of robust estimators developed in robust statistics.

For the RL regulatory control problem solved, any regulatory loop instability behaves in a way like outliers: it produces bad data to be used for the advantage function estimation which cause the advantage estimate to be inaccurate.

An example solution in accordance with this disclosure uses a modified policy that is based on the advantage function sign (positive, negative) ignoring its absolute value. A proposed method updates the policy taking the action which has the highest probability of bringing a positive advantage over the baseline policy instead of those which bring the largest positive magnitude in advantage. This may be implemented by maximizing the sign of the advantage instead of its value:

$$a_{new} = \arg \max_a \text{ sign } A^\pi(a, x)$$

Or possibly a soft continuous version of the sign function $\sigma(A^\pi)$ to avoid problems with discontinuity:

$$\sigma(A^\pi) = \begin{cases} -1, & A^\pi \le -A_0 \\ +1, & A^\pi \ge +A_0 \\ A^\pi/A_0, & -A_0 < A^\pi < A_0 \end{cases}$$

This choice still secures the convergence to the optimal policy, although the convergence rate may be slower compared to the greedy approach in ideal conditions (without outliers). At the same time, this choice is less sensitive to outliers, i.e. effects of the unknown process states.

Because it does not use the value of the advantage function but just its sign, the illustrative non-greedy method effectively classifies the actions into two categories: the actions that make the return better versus the actions that make the return worse (at an environment state). Then any of the former actions are adopted by the next policy iteration. The optimization may prefer the actions that improve the policy with the high probability. This improves the robustness of the approach even further.

As an example, the RL problem may be simplified considering a finite horizon control. The agent starts with the environment at a state x and terminates at the next state y. At this state, the return is terminated and no future rewards are considered. The advantage function can be written without considering the $V^\pi(x)$ explicitly as:

$$A^\pi(\alpha,x) = r(\alpha,x) + E\{r(\alpha,y)|\alpha,x\} - r(\pi(x),x) - E\{r(\pi(y),y) | \pi(x),x\}$$

This simplifies the problem: the advantage function estimate can be consistently approximated simply averaging N samples instead of considering the statistical expectation. First, define the empirical cost-to-go:

$$V_\alpha(x) = r(\alpha,x) + (\pi(y),y)$$

$$V^\pi(x) = r(\pi(x),x) + r(\pi(y),y)$$

Then the empirical advantage sample is the difference between those two costs $$A_N^\pi(a, x) = \sum_{k=1}^{N} V_\alpha(x) - V^\pi(x)$$

The average is an empirical advantage datum obtained by testing an action N times and observing the costs. Consider the actual advantage function at the current initial state is x $$A^\pi(\alpha,x) = 1 - 16\alpha^2$$

From here, the optimal action is clearly zero. Suppose the empirical advantage converges to the actual advantage for $N \to \infty$ but the rate of convergence is much slower for suboptimal actions. This represents a similar mechanism like the regulatory control instability: it is much harder to determine the actual advantage or actual disadvantage for the suboptimal destabilizing controllers because these will be very sensitive to the intermediate states as well to the process nonlinearities and other complex effects.

Figure 4A:
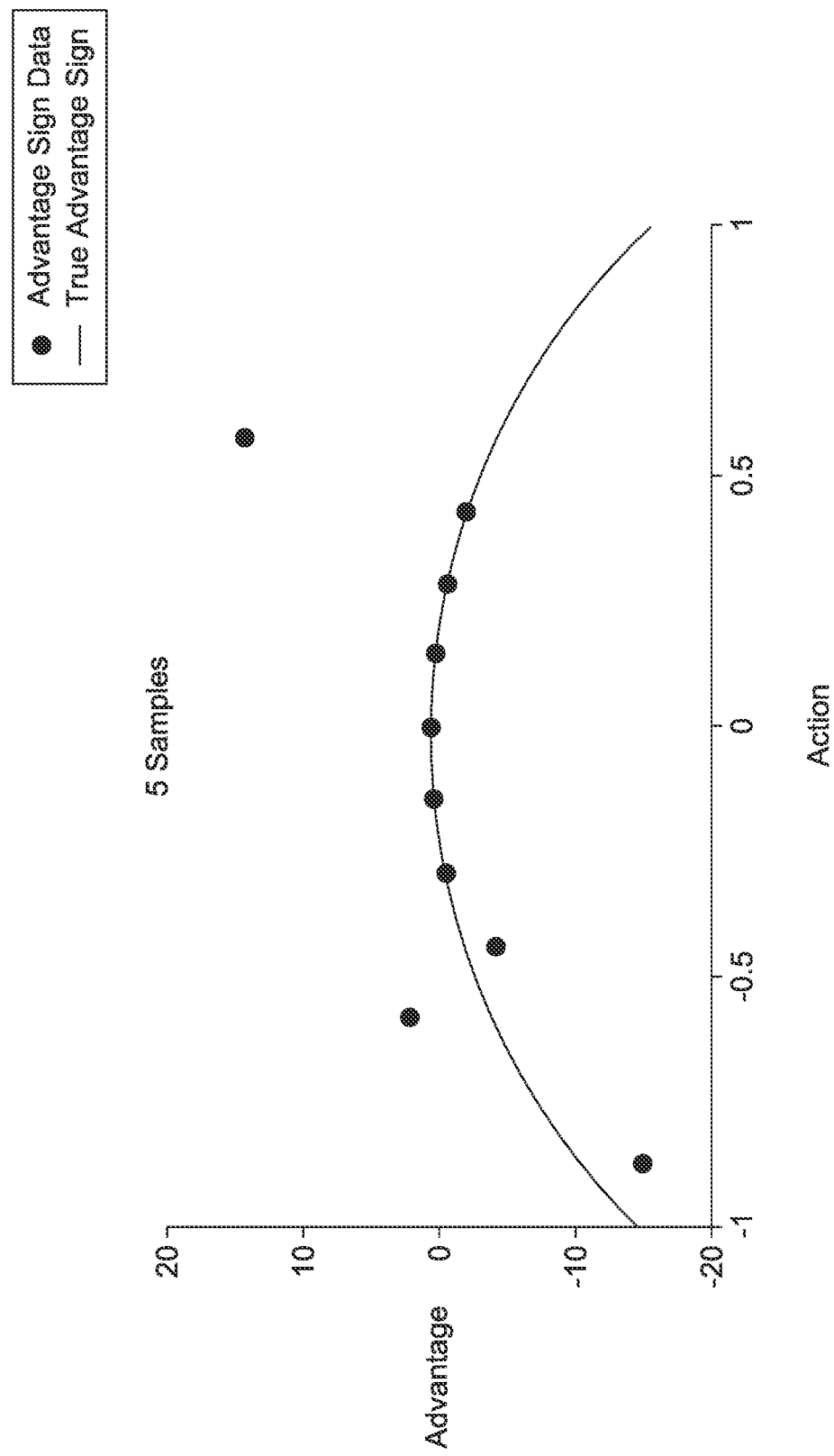
FIGS. 4A through 4D are graphs showing an example convergence of an expected advantage maximization approach over an increasing number of samples.
Figure 4B:
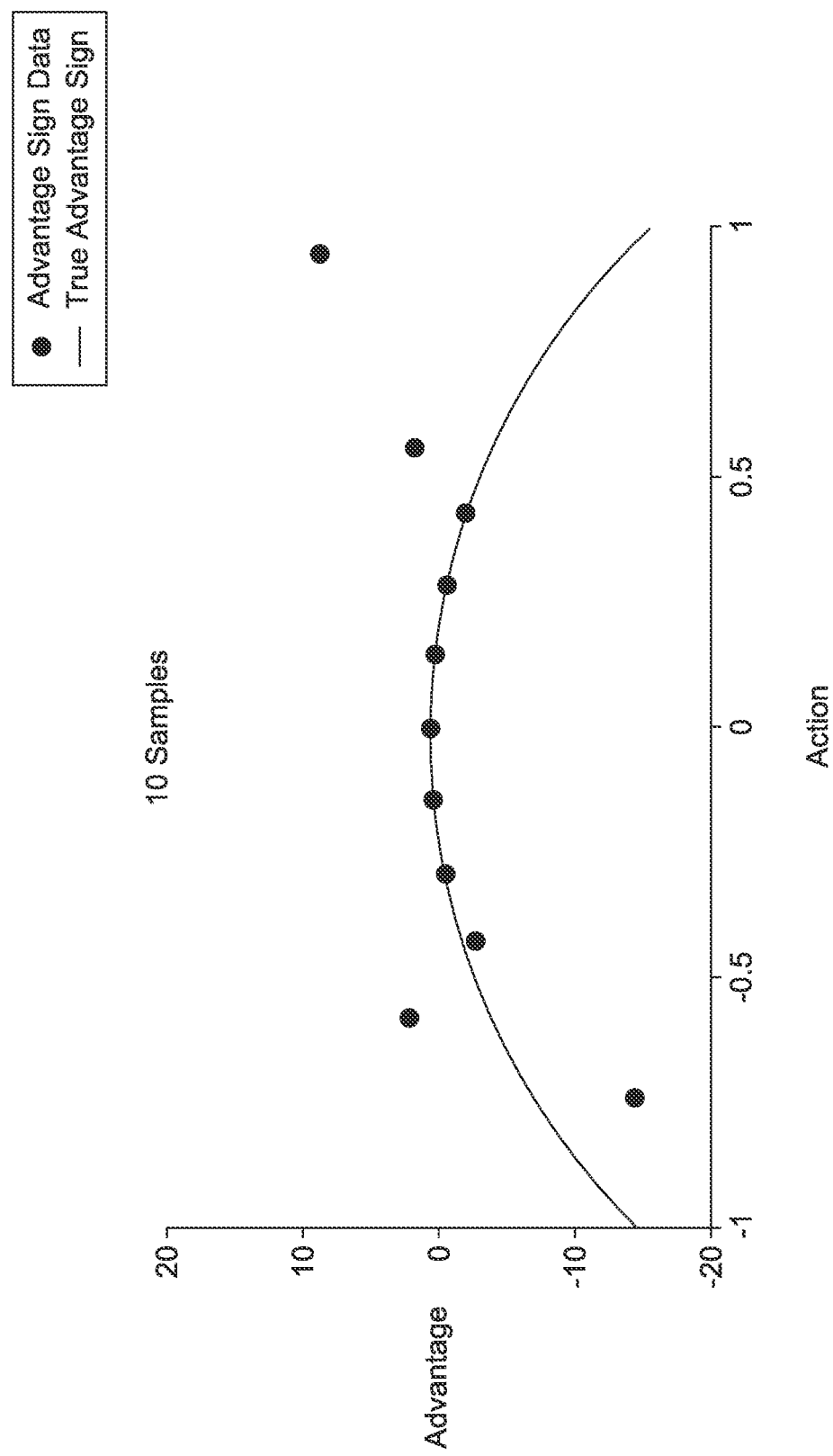
Figure 4C:
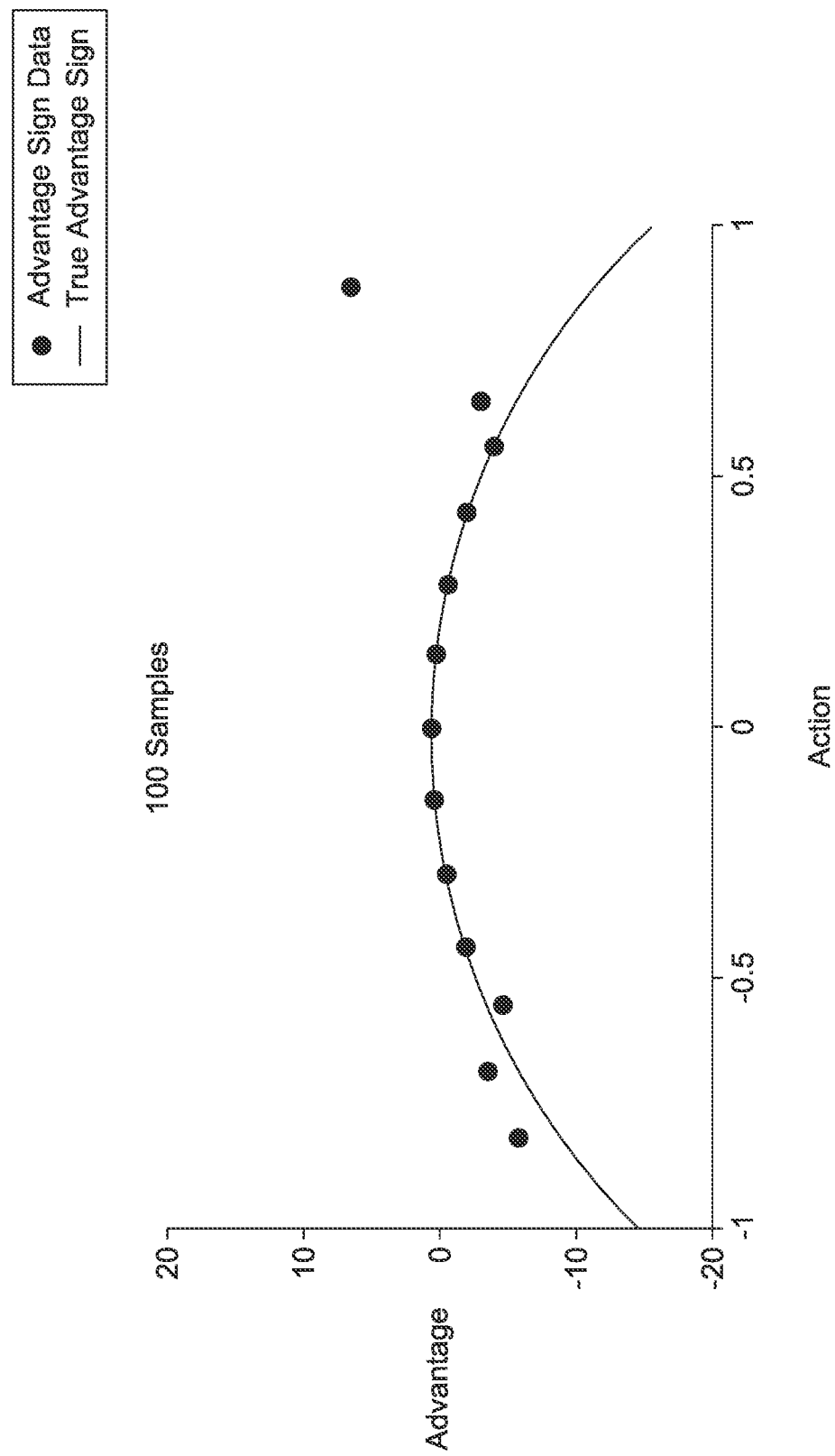
Figure 4D:
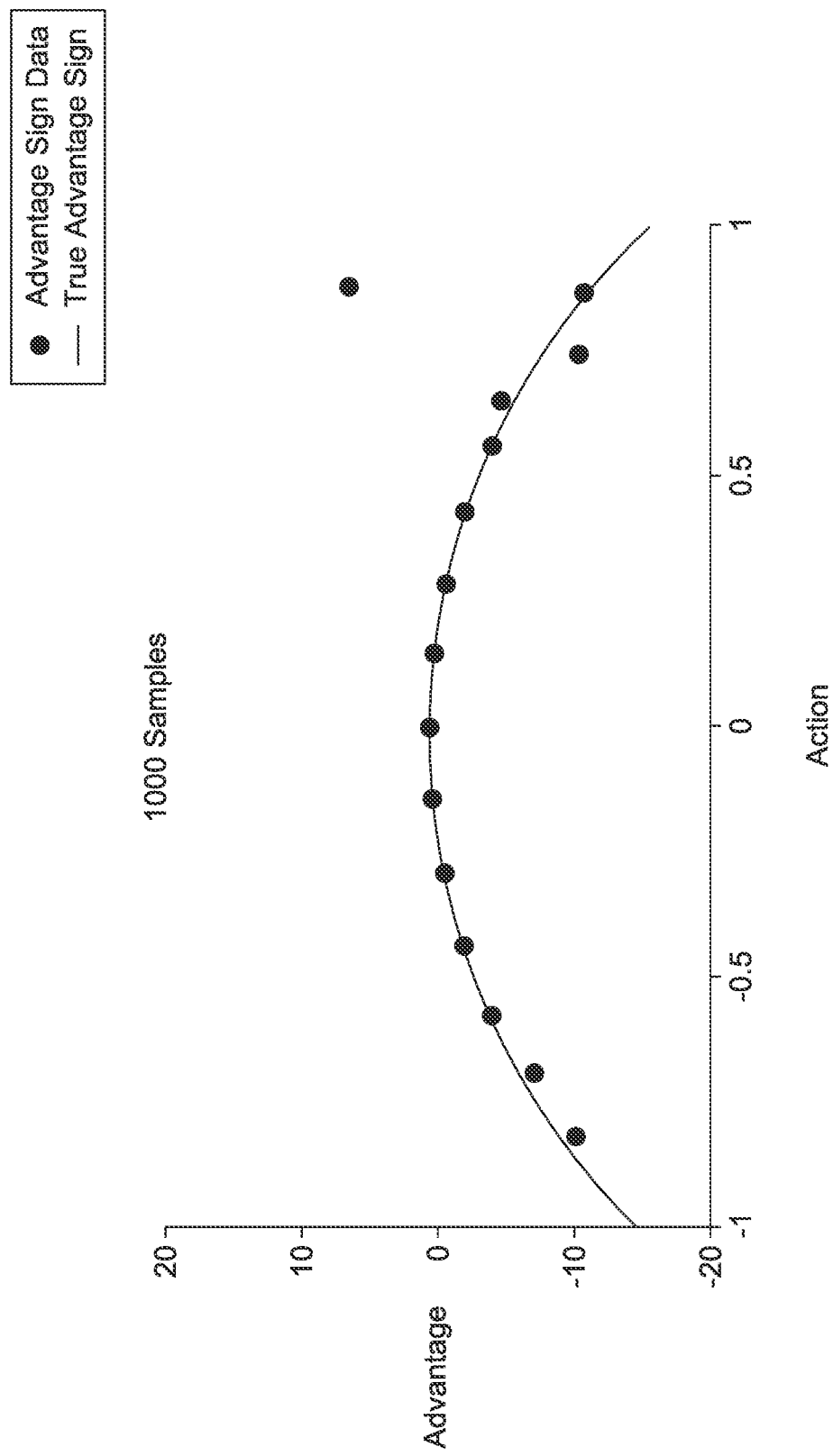

The purpose of this example is to visualize the difference between expected advantage maximization versus the expected advantage sign maximization. This can be seen in FIGS. 4A through 4D, which shows an example convergence of an expected advantage maximization approach (i.e. greedy approach) over an increasing number of samples N. FIG. 4A visualizes an example in which N=5. FIG. 4B visualizes an example in which N=10. FIG. 4C visualizes an example in which N=100. FIG. 4D visualizes an example in which N=1000. It may be noted that average advantage converges rapidly for actions close to zero, i.e. close to the optimal action. However, the data further from zero are significantly affected by the outliers. In the example shown, the maximum averaged advantage value is for action a=1, even after 1,000 samples. Even after 1,000 tests, the optimal action for a state cannot be reliably determined.

Figure 5A:
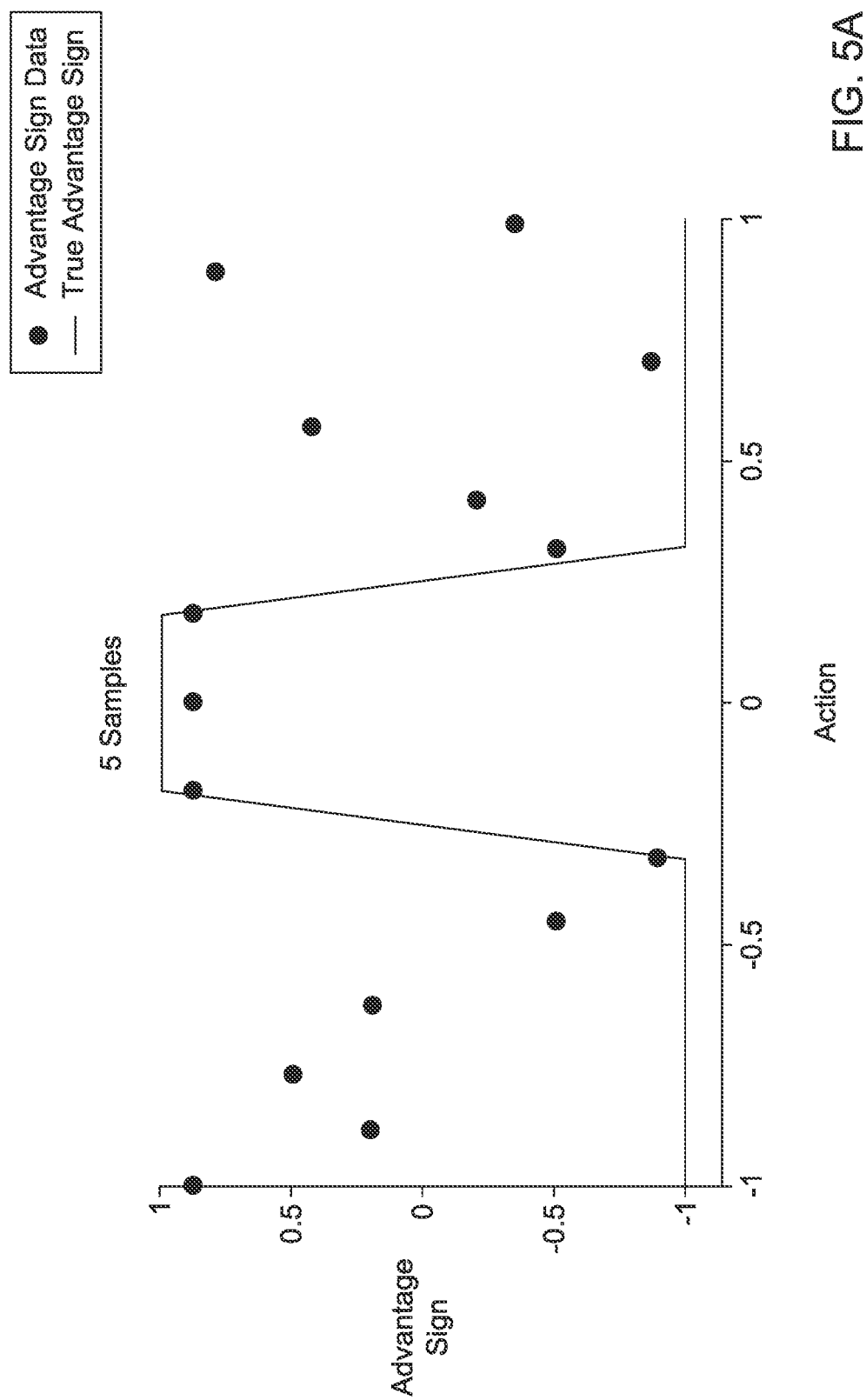
FIGS. 5A through 5D are graphs showing an example convergence of an expected advantage sign maximization approach over the same increasing number of samples.
Figure 5B:
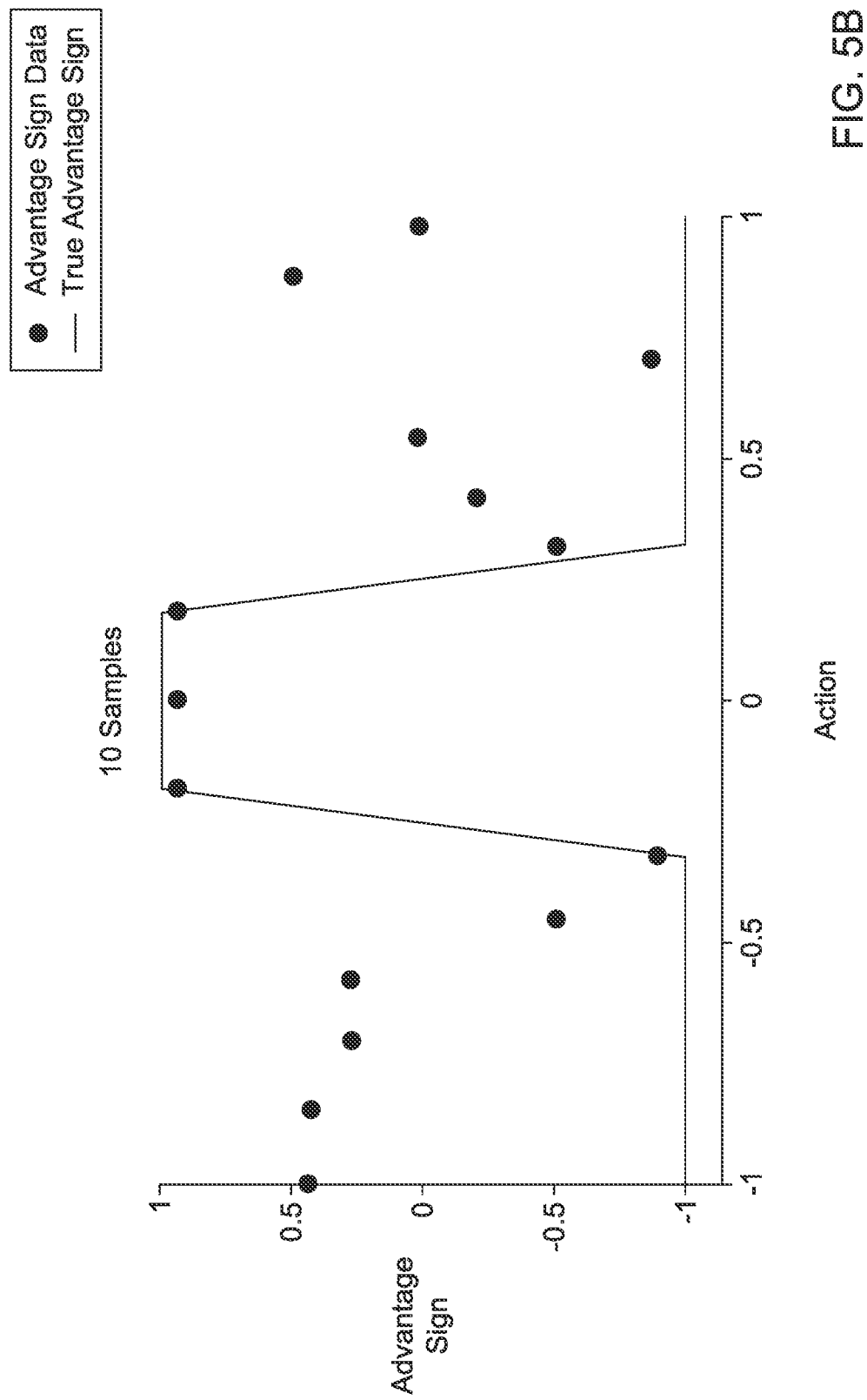
Figure 5C:
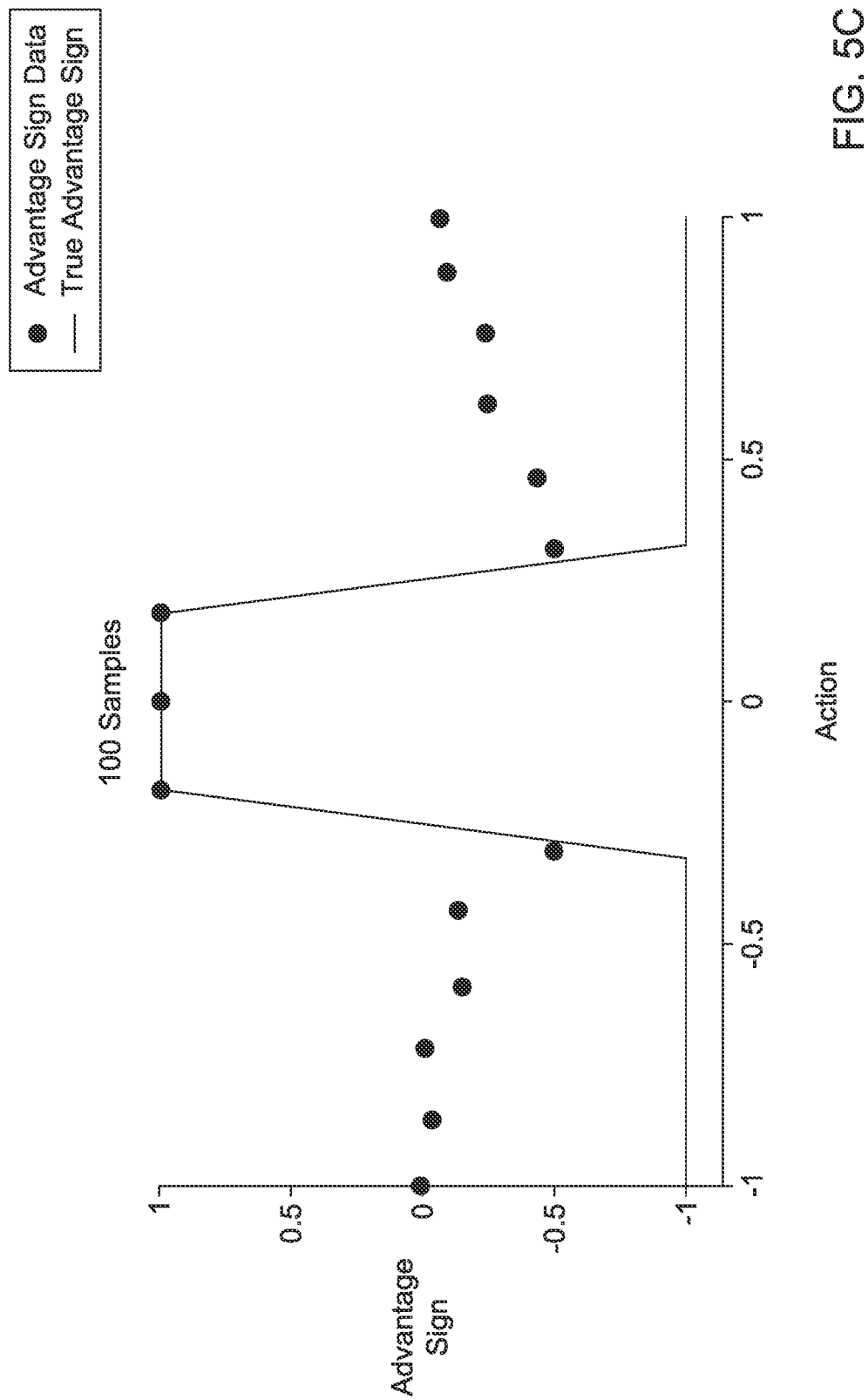
Figure 5D:
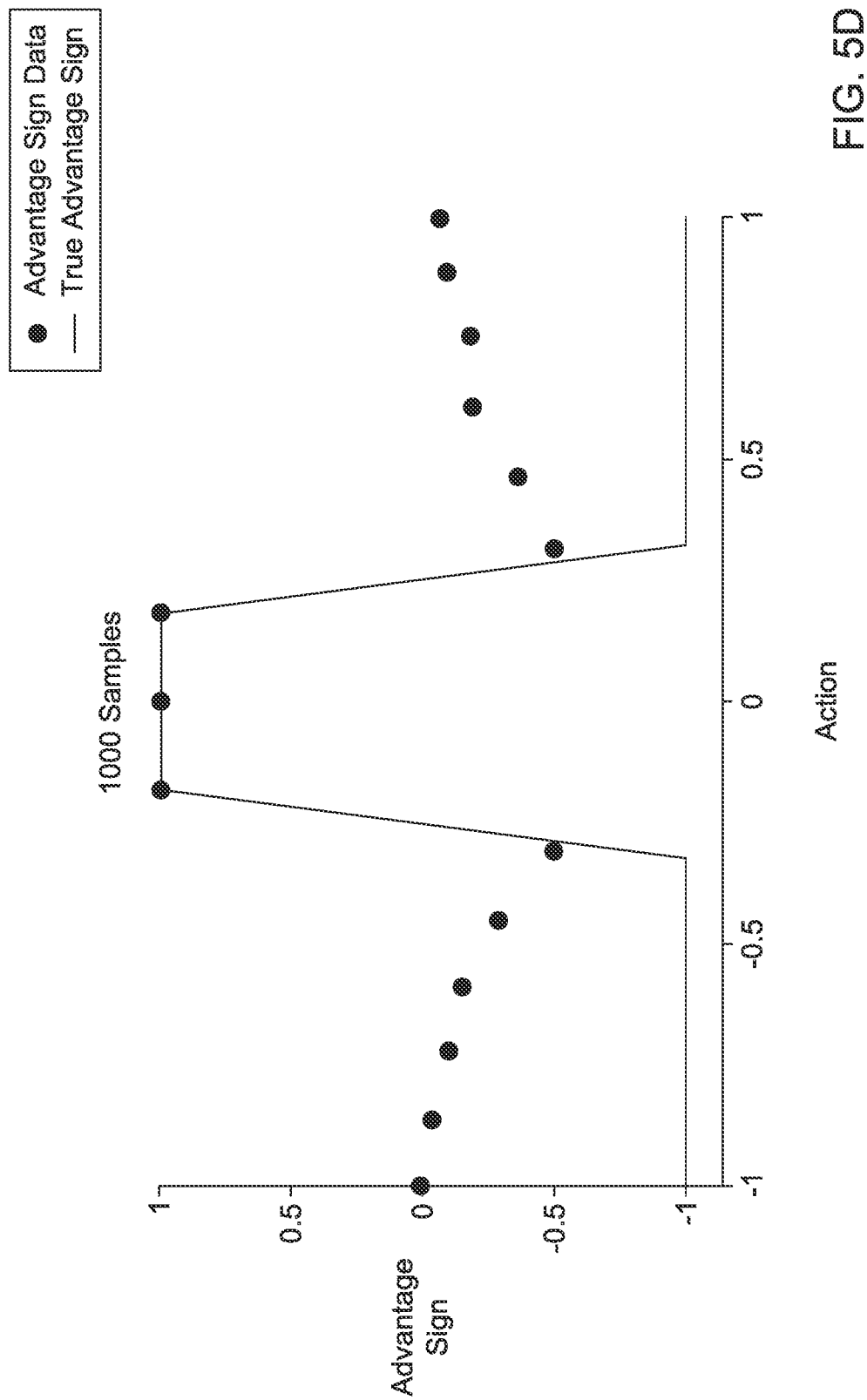

FIGS. 5A through 5D are graphs showing an example convergence of an expected advantage sign maximization approach (i.e. non greedy approach) over the same increasing number of samples. FIG. 5A visualizes an example in which N=5. FIG. 5B visualizes an example in which N=10. FIG. 5C visualizes an example in which N=100. FIG. 5D visualizes an example in which N=1000. As can be seen, the highest average advantage sign is perceived for actions close to zero even after as little as 10 samples. After 100 samples, the actions close to zero are clearly dominating, meaning that that an approximately correct answer is obtained at least 100 times faster compared to the greedy approach. It may be noted that the average sign is close to zero for actions very far from zero. It is because such actions gave inconsistent results with positive or negative advantage with almost equal probability. It should be noted that FIGS. 4A-4D and 5A-5D are based on the same data, i.e. the same outliers. It is the robustness of the non-greedy sign-based approach that makes the later results better.

It cannot be concluded that the proposed non-greedy approach converges 100 times faster in general because this example is artificial in the sense that the outliers were emphasized. However, it is a valid conclusion that maximizing the average advantage "sign" is significantly more robust in the presence of outliers. It may be noted how the simplified example differs from the typical regulatory control example. The regulatory control problem is not a finite horizon problem. The advantage function will not be estimated by a least-squares fitting algorithm instead of simple reward averages.

The illustrative sign-based approach improves the RL robustness and generally provides a faster convergence rate. Implementing such an approach on embedded computer hardware commonly used in a regulatory control layer may be difficult, depending on the processing power available at the regulatory control layer. In some cases, some or all of the algorithm may be performed on more powerful hardware such as on a server or in the cloud.

While RL could be implemented by sending the process data to the server every sampling period, including the current controlled variable, set-point and the manipulated variable (e.g. valve position), this can represent a significant amount of data such as about 1 Mbyte per day per controller supposing single precision arithmetic and 1 second sampling period. Accordingly, and in some cases, the advantage function estimator does not use the raw data, but instead uses the initial and the terminal states x, y, the action a used over that evaluation period and the reward r(a, x). If the states are approximated with the control error and the action is representing PID gains, this would represent only about 33.75 kbyte per day per controller supposing single precision arithmetic and 1 minute evaluation period, which would present about a 30× data reduction.

In an example implementation, the regulatory control edge device runs multiple PI and PID controller algorithms or similar fixed structure controllers each parameterized with a finite number of values. In the case of PID, the controller gain, integration and derivative time constant may represent the controller tuning vector of the control policy. At any time, the edge device may hold a tuning vector currently representing the best-known values which can be denoted a*. To achieve the autonomous optimization of the tuning vector, the edge device applies random perturbations to these currently best-known tuning values. The magnitude of the perturbations may be optimized but more often a reasonably small randomized perturbation ±10% may suffice. Such perturbations may be numbered by an index i. In terms of RL, each such perturbation represents an action of the agent. Each perturbation is applied for a sufficiently long evaluation period to minimize the effects of the intermediate states. At the evaluation period start, the initial state $x_i$ of the process is recorded. This $x_i$ involves only the observable states, the unknown states are ignored. In regulatory control, $x_i$ is often the initial control error, sometimes the control error and its derivative. During the evaluation period, the edge device integrates the instantaneous rewards to evaluate the tuning performance associated with the period: $r_{ti}$. At the evaluation period end, the process terminal state $y_i$ is recorded and the three items are send to the hardware running the RL algorithm along with the actual tuning $\alpha_i$ as a single record. Thus, the record #i may include the following items:

1. Tuning values $\alpha_i$
2. Initial process state $x_i$
3. Aggregated loss $r_i$
4. Terminal process state $y_i$ The reward aggregation for a typical regulatory control problem will include the summation of terms related to the control error and actuator activity. Usually the following two terms may be used:

$$r_i(t+1)=r_i(t)-(y_{cv}(t)-y_{sp}(t))^2-\rho(u_{mv}(t)-u_{mv}(t-1))^2,$$

where $y_{cv}(t)$, $y_{sp}(t)$ are the controlled variable and its set-point respectively and $u_{mv}(t)$ is the manipulated variable (controller output) at time t. The non-negative p is a tuning parameter used to define the optimal speed of response.

The hardware running the RL algorithm aggregates the records [$x_i$, $y_i$, $\alpha_i$, $r_i$] and uses them to calculate the cost-to-go function $V^0(x)$ which represents the expected return as a function of the process state averaged over the tuning values tested so far. Such cost-to-go represents a baseline performance of the edge device controller when using the current tuning values a* including their random perturbations. If nothing would have changed, this would be the performance of the controller. It can be described as "historical performance."

The $V^0(x)$ or cost-to-go function estimation is a standard problem known in RL. A reasonable approach is the Least-Squares Temporal Difference Learning. It is known that $V^0(x)$ function is a multivariable quadratic function in case a) the controlled process is linear b) the reward function is a quadratic function of the process state and the controller output. Such approximations are often reasonable for PID regulatory controllers. If it is the case, the $V^0(x)$ estimation algorithm will be like a quadratic polynomial regression.

After having estimated $V^0(x)$, the proposed algorithm calculates the advantage values achieved by the tested tuning values $\alpha_i$ at all initial process states $x_i$. Each test record issues one such advantage value:

$$A_i^0 = r_i + V_0(y_i) - V^0(x_i)$$

Positive $A_i$ indicate evaluation periods during which the edge device performed above average and vice versa. The algorithm uses such data to classify the actions (tuning vectors) into two classes: above average (or average at worst) $A_i^0 \geq 0$ and below average $A_i^0 < 0$. This classification is in fact a model of the $A_i^0$ sign. The tuning values which performed below average can now be rejected and eliminated from the data. In the next iteration, the improved cost-to-go can be calculated $V^1(x)$ not accounting for the rejected evaluation periods. The further improvement is achieved classifying the perturbations into below versus above average with respect to $V^1(x)$ using the refined advantage values $A_i^1$. This process finally converges to an $A_i^n$ after n iterations presumably approximating the advantage function of the optimal policy, i.e. $A_i^n \geq 0$. It can be noted that while the advantage values are calculated even for eliminated periods at every iteration, the elimination concerns only the cost-to-go calculations.

The optimal controller tuning is finally defined as an action classified as being not below average with the highest possible probability:

$$a(x)^* = \arg\max_a \ \text{sign} \ A^n(a, x)$$

This method would produce a controller tuning of which depends on the process state. However, simple controllers like PID are more frequently described by tuning values which are constant, independent on the process state. This can be overcome by eliminating the state x, e.g. averaging it:

$$a^* = \arg\max_a \ \text{sign} \ \frac{1}{N}\sum_{x_i} A^n(a, x).$$

In this way, the tuning vector which performs optimally on average is preferred instead of a state—dependent optimal tuning. Sometimes, the tuning dependency on the state may be desirable. Finally, the above calculated a* representing an improved controller tuning vector is sent back to the edge device. There, it replaces the current values and the edge device starts applying it including the randomized perturbations. This process may be repeated going forward. In this way, the controller tuning is permanently adapting to the changing environment.

The advantage function (or other value function like Q-function) based reinforcement learning is a standard machine learning method. All standard RL algorithm assume that complete state observation is available, and the state transition depends on the current state and the action (Markovian assumption). Partially observable Markov decision process (POMDP) is a generalization of Markov decision process (MDP) that incorporates the incomplete state observation model. It turns out that POMDP can be treated as the standard MDP using the belief state as opposed to the unknown state. The problem is that RL formulated for the belief state is complicated even for simple problems. For this reason, specific algorithms and approximations have been developed for POMDP learning. The present disclosure can be viewed as a simple heuristic solution to this complicated problem.

The disclosed approach does not address the unknown states problem directly. Rather, it proposes to extend the evaluation period, i.e. the time an action is applied. Over an extended period, the unknown initial condition may typically become negligible. However, this works with stable controllers. Unstable controllers run for an extended time amplify the unknown initial condition. The disclosure addresses this by modifying the approach so that the likelihood that the new action is better (has a positive advantage) is maximized as opposed to the standard maximization of the advantage value. This makes the method more robust. The unstable controllers do not yield consistent advantage results. The advantage values observed by running unstable controllers will have large variance. However, their advantage values will not be consistently positive.

Figure 6:
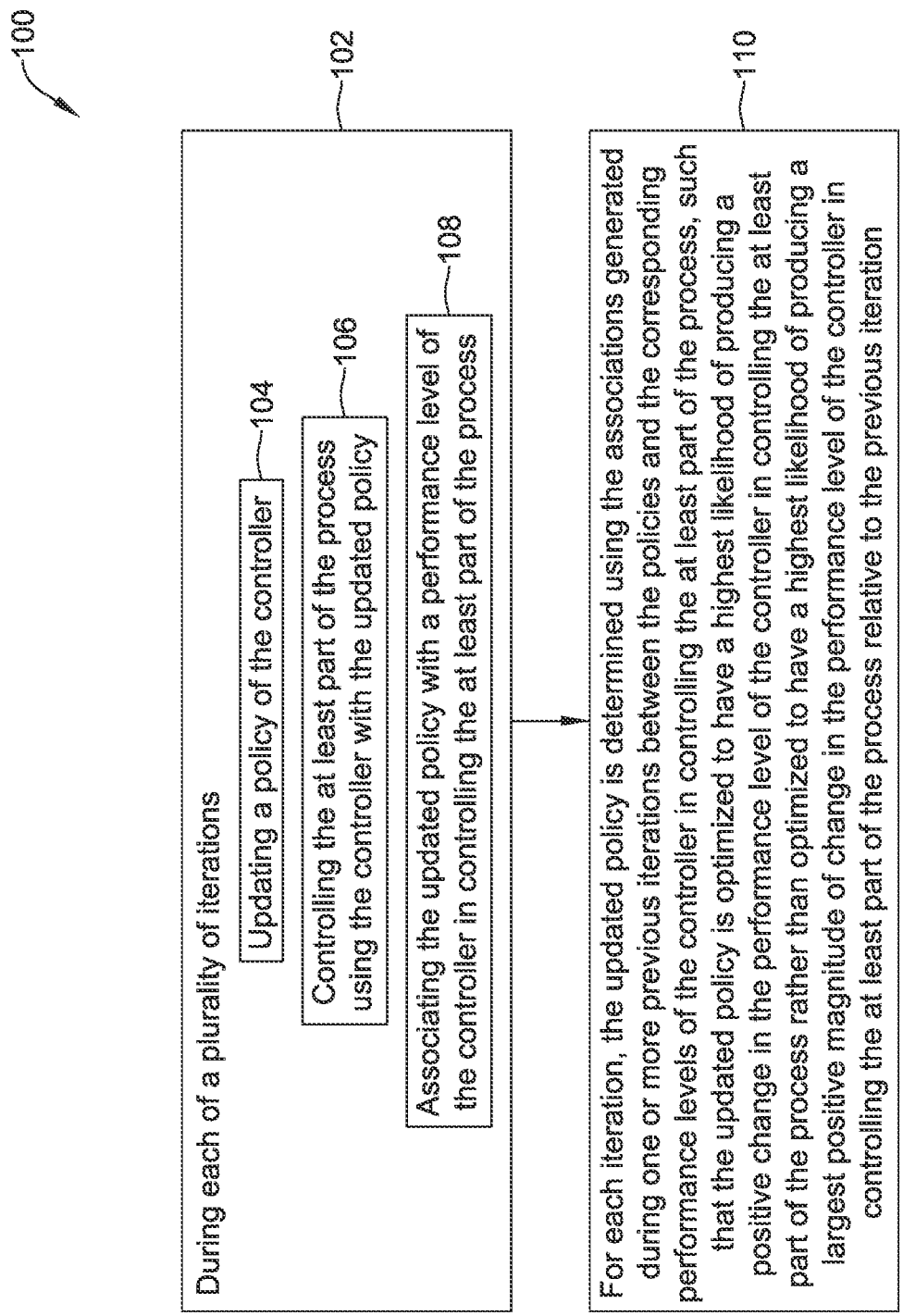
FIG. 6 is a flow diagram showing an illustrative method.

FIG. 6 is a flow diagram showing an illustrative method 100 of tuning a controller (such as the controllers 12, the edge controller 38 and the controller 50) that is configured to control at least part of a process. The method 100 includes performing several steps during each of a plurality of iterations, as indicated at block 102. During each iteration, a policy of the controller is updated, as indicated at block 104. In some cases, the controller is a regulatory controller and the updated policy may include tuning parameters. The tuning parameters may, for example, include one or more of a Proportional (P) gain, an Integral (I) gain and a Derivative (D) gain. These are just examples. In some cases, the controller may be configured to control an HVAC actuator such as but not limited to a water valve or an air damper. The controller may be configured to control at least part of an industrial process such as but not limited to a refinery process.

The at least part of the process is controlled using the controller with the updated policy, as indicated at block 106. The updated policy is associated with a performance level of the controller in controlling the at least part of the process, as indicated at block 108.

As indicated at block 110, and for each iteration, the updated policy is determined using the associations generated during one or more previous iterations between the policies and the corresponding performance levels of the controller in controlling the at least part of the process, such that the updated policy is optimized to have a highest likelihood of producing a positive change in the performance level of the controller in controlling the at least part of the process rather than optimized to have a highest likelihood of producing a largest positive magnitude of change in the performance level of the controller in controlling the at least part of the process relative to the previous iteration.

In some cases, and for each iteration, the updated policy may be determined using reinforcement learning based on an advantage function, and wherein the updated policy is based on a sign of the advantage function and not an absolute value of the advantage function. During each of the plurality of iterations, the at least part of the process is controlled using the controller with the updated policy for at least a period of time, wherein the period of time is sufficient to allow a measurable response to control actions taken by the controller in accordance with the updated policy. In some cases, the controller is an edge controller operatively coupled to a remote server, and the updated policy is determined by the remote server and communicated down to the controller before the controller controls the at least part of the process using the updated policy.

Figure 7:
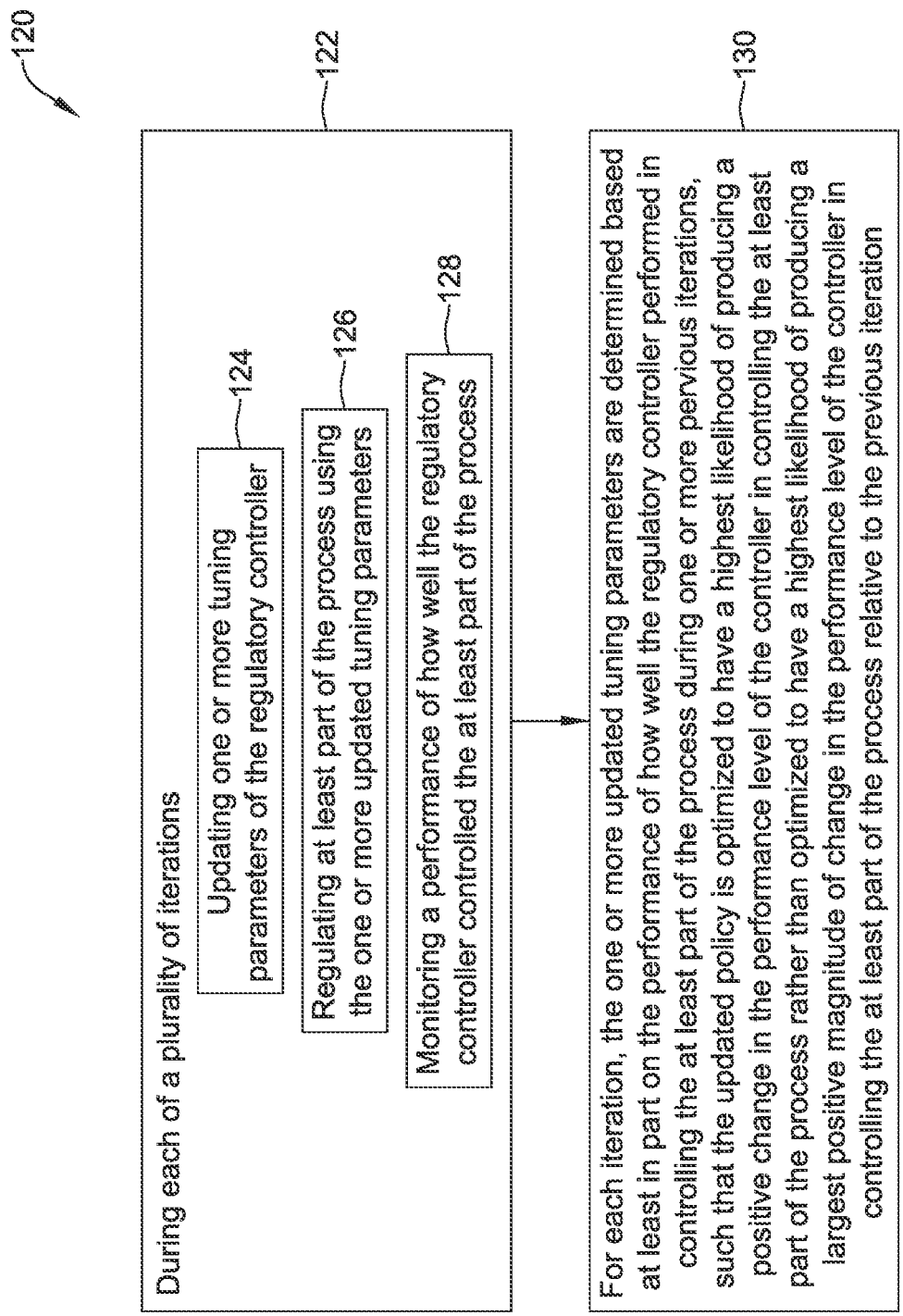
FIG. 7 is a flow diagram showing another illustrative method.

FIG. 7 is a flow diagram showing an illustrative method 120 of tuning a regulatory controller that is configured to regulate at least part of process. The method 120 includes performing several steps during each of a plurality of iterations, as indicated at block 122. During each iteration, one or more tuning parameters of the regulatory controller are updated, as indicated at block 124. At least part of the process is regulated using the one or more updated tuning parameters, as indicated at block 126. A performance of how well the regulatory controller controlled the at least part of the process is monitored, as indicated at block 128. For each iteration, and as indicated at block 130, the one or more updated tuning parameters are determined based at least in part on the performance of how well the regulatory controller performed in controlling the at least part of the process during one or more previous iterations, such that the updated one or more tuning parameters are optimized to have a highest likelihood of producing a positive change in the performance of how well the regulatory controller controlled the at least part of the process rather than optimized to have a highest likelihood of producing a largest positive magnitude of change in the performance of how well the regulatory controller controlled the at least part of the process relative to the immediate previous iteration.

In some instances, and for each iteration, the updated one or more tuning parameters may be determined using reinforcement learning based on an advantage function, and wherein the updated one or more tuning parameters are based on a sign of the advantage function and not an absolute value of the advantage function. Controlling the at least part of the process using the regulatory controller with the updated one or more tuning parameters may be performed for at least a period of time, wherein the period of time is sufficient to allow a measurable response to control actions taken by the regulatory controller in accordance with the updated one or more tuning parameters. The one or more tuning parameters may include one or more of a Proportional (P) gain, an Integral (I) gain and a Derivative (D) gain.

The regulatory controller may be configured to control an HVAC actuator of an HVAC system. In some cases, the regulatory controller may be an edge controller operatively coupled to a remote server, and wherein the updated one or more tuning parameters are determined by the remote server and communicated down to the regulatory controller before the regulatory controller controls the at least part of the process using the updated one or more tuning parameters.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of controlling one or more pieces of equipment using a controller, the method comprising:
the controller controlling one or more pieces of equipment by providing control actions to the one or more pieces of equipment, wherein the controller implements a policy that produces a corresponding performance level in controlling the one or more pieces of equipment;
while controlling the one or more pieces of equipment, and during each of a plurality of iterations:
updating the policy of the controller;
controlling the one or more pieces of equipment by providing updated control actions taken by the controller in accordance with the updated policy; and
identifying an updated performance level of the controller in controlling the one or more pieces of equipment;
associating the updated policy with the updated performance level of the controller in controlling the one or more pieces of equipment;
wherein for each iteration, the updated policy is determined using the associations generated during one or more previous iterations between the policies and the corresponding performance levels of the controller in controlling the one or more pieces of equipment, such that the updated policy is optimized to have a highest likelihood of producing a positive sign in a change in the performance level of the controller in controlling the one or more pieces of equipment without regard to a magnitude of the change rather than optimized to have a highest likelihood of producing a largest positive magnitude of change in the performance level of the controller in controlling the one or more pieces of equipment relative to the previous iteration; and
wherein for each iteration, the updated policy is determined using reinforcement learning based on an advantage function, and wherein the updated policy is optimized to have a highest likelihood of producing an advantage function sign that is positive while ignoring an absolute value of the advantage function.

2. The method of claim 1, wherein controlling the one or more pieces of equipment using the updated policy during each of the plurality of iterations is performed for at least a period of time, wherein the period of time is sufficient to allow a measurable response to the updated control actions taken by the controller in accordance with the updated policy.

3. The method of claim 1, wherein the controller is a regulatory controller and the updated policy comprises tuning parameters.

4. The method of claim 3, wherein the tuning parameters comprise one or more of a Proportional (P) gain, an Integral (I) gain and a Derivative (D) gain.

5. The method of claim 3, wherein the one or more pieces of equipment comprises an HVAC actuator.

6. The method of claim 5, wherein the HVAC actuator comprises a water valve.

7. The method of claim 5, wherein the HVAC actuator comprises an air damper.

8. The method of claim 1, wherein the one or more pieces of equipment are at least part of an industrial process.

9. The method of claim 8, wherein the industrial process comprises a refinery process.

10. The method of claim 1, wherein the controller is an edge controller operatively coupled to a remote server, and wherein the updated policy for each iteration is determined by the remote server and communicated down to the controller before the controller controls the one or more pieces of equipment using the updated policy.

11. A method of controlling one or more pieces of equipment using a regulatory controller, the regulatory controller configured to regulate the one or more pieces of equipment, the method comprising:
the regulatory controller regulating one or more pieces of equipment by providing control actions to the one or more pieces of equipment, wherein the regulatory controller uses one or more programmable tuning parameters in regulating the one or more pieces of equipment;

while controlling the one or more pieces of equipment, and during each of a plurality of iterations:
updating one or more of the tuning parameters of the regulatory controller;
regulating the one or more pieces of equipment using the one or more updated tuning parameters;
monitoring a performance of how well the regulatory controller controlled the one or more pieces of equipment using the one or more updated tuning parameters;
wherein for each iteration, the one or more updated tuning parameters are determined based at least in part on the performance of how well the regulatory controller performed in controlling the one or more pieces of equipment during one or more previous iterations, such that the updated one or more tuning parameters are optimized to have a highest likelihood of producing a positive sign n-a change in the performance of how well the regulatory controller controlled the one or more pieces of equipment without regard to a magnitude of the change rather than optimized to have a highest likelihood of producing a largest positive magnitude of change in the performance of how well the regulatory controller controlled the one or more pieces of equipment relative to the immediate previous iteration; and
wherein for each iteration, the updated one or more tuning parameters are determined using reinforcement learning based on an advantage function, and wherein the updated one or more tuning parameters are optimized to have a highest likelihood of producing an advantage function sign that is positive while ignoring an absolute value of the advantage function.

12. The method of claim 11, wherein controlling the one or more pieces of equipment at least part of the process using the updated one or more tuning parameters during each of the plurality of iterations is performed for at least a period of time, wherein the period of time is sufficient to allow a measurable response to control actions taken by the regulatory controller in accordance with the updated one or more tuning parameters.

13. The method of claim 11, wherein the one or more tuning parameters comprise one or more of a Proportional (P) gain, an Integral (I) gain and a Derivative (D) gain.

14. The method of claim 11, wherein the one or more pieces of equipment comprises an HVAC actuator of an HVAC system.

15. The method of claim 11, wherein the regulatory controller is an edge controller operatively coupled to a remote server, and wherein the updated one or more tuning parameters are determined by the remote server and communicated down to the regulatory controller before the regulatory controller controls the one or more pieces of equipment using the updated one or more tuning parameters.

16. A controller for controlling at least part of a process, the controller comprising:
a memory for storing a policy of the controller;
a processor operatively coupled to the memory;
the processor configured to provide one or more control actions to control at least part of the process, wherein one or more control actions are based on the policy;
the processor configured to perform a plurality of iterations, wherein during each iteration the processor:
updates the policy of the controller;
provides one or more control actions based on the updated policy to control the at least part of the process;
associates the updated policy with a performance level of the controller in controlling the at least part of the process;
wherein for each iteration, the updated policy is determined using the associations generated during one or more previous iterations between the policies and the corresponding performance levels of the controller in controlling the at least part of the process, such that the updated policy is optimized to have a highest likelihood of producing a positive sign in a change in the performance level of the controller in controlling the at least part of the process without regard to a magnitude of the change rather than optimized to have a highest likelihood of producing a largest positive magnitude of change in the performance level of the controller in controlling the at least part of the process relative to the immediate previous iteration; and
wherein for each iteration, the updated one or more tuning parameters are determined using reinforcement learning based on an advantage function, and wherein the updated one or more tuning parameters are optimized to have a highest likelihood of producing an advantage function sign that is positive while ignoring an absolute value of the advantage function.

17. The controller of claim 16, wherein the processor is configured to determine the updated policy.

18. The controller of claim 16, wherein the processor is configured to:
communicate one or more parameters indicative of the performance level of the controller in controlling the at least part of the process to a remote device; and
receive the updated policy from the remote device.

* * * * *